United States Patent
Almurayh

(10) Patent No.: US 9,973,619 B2
(45) Date of Patent: May 15, 2018

(54) METHOD AND DEVICE FOR IMPLEMENTING A QUIET ZONE

(71) Applicant: University of Dammam, Dammam (SA)

(72) Inventor: Abdullah Saeed Almurayh, Dammam (SA)

(73) Assignee: University of Dammam, Dammam (SA)

( * ) Notice: Subject to any disclaimer, the term of this patent is extended or adjusted under 35 U.S.C. 154(b) by 71 days.

(21) Appl. No.: 14/938,495

(22) Filed: Nov. 11, 2015

(65) Prior Publication Data
US 2017/0134564 A1    May 11, 2017

(51) Int. Cl.
H04M 1/725    (2006.01)
H04W 4/02    (2018.01)

(52) U.S. Cl.
CPC ... *H04M 1/72572* (2013.01); *H04M 1/72569* (2013.01); *H04W 4/023* (2013.01)

(58) Field of Classification Search
CPC ..... H04W 12/08; H04W 12/06; H04W 4/001; H04W 4/04; H04W 4/206; H04W 4/22; H04W 76/007; H04W 8/24; H04W 92/18; H04W 4/023
USPC .... 455/414.1, 404.1, 404.2, 41.1, 41.2, 421, 455/422.1, 418, 419, 420
See application file for complete search history.

(56) References Cited

U.S. PATENT DOCUMENTS

| | | | |
|---|---|---|---|
| 8,018,496 B2 | 9/2011 | Nath et al. | |
| 8,594,738 B2 | 11/2013 | Cook et al. | |
| 2006/0022048 A1* | 2/2006 | Johnson | H04L 69/329 235/462.1 |
| 2006/0063563 A1 | 3/2006 | Kaufman | |
| 2007/0254633 A1* | 11/2007 | Mathew | H04M 1/665 455/412.1 |
| 2013/0225152 A1 | 8/2013 | Matthews, III et al. | |
| 2013/0254186 A1 | 9/2013 | Kim et al. | |
| 2014/0113593 A1 | 4/2014 | Zhou et al. | |

OTHER PUBLICATIONS

Vpasana, http://itunes.apple.com/us/app/vpasana/id948707682?mt=8.
Rohit Madhukar Chaskar, "Location Based Automatic Sound Profile Switching Application in Android Mobiles", International Journal of Computer & Communication Technology, vol. 4, Issue 2, 2013, pp. 84-87.

* cited by examiner

*Primary Examiner* — Jean Gelin
(74) *Attorney, Agent, or Firm* — Oblon, McClelland, Maier & Neustadt, L.L.P.

(57) ABSTRACT

A quiet zone can be implemented using a quiet zone transceiver. The quiet zone can have a predetermined perimeter created by the quiet zone transceiver. A smart mobile device can cause an initial alert setting of the smart mobile device to automatically change to a silent alert setting when the smart mobile device is moved into the quiet zone. Additionally, when the smart mobile device is moved out of the quiet zone, the initial alert setting can be restored. The smart mobile device can also be used as the quiet zone transceiver to create the quiet zone if the user of the smart mobile device wishes to create an area in which disturbances such as loud alert settings are limited.

20 Claims, 9 Drawing Sheets

METHOD AND DEVICE FOR IMPLEMENTING A QUIET ZONE

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Smart mobile devices have become more of a necessity than a luxury. The convenient size and usefulness of smart phones has caused smart phone users to have their smart phone with them at all times, including areas where the noise a smart phone makes when alerting the user about an incoming communication, notification, update, and the like could be considered distracting to others occupying the same area. Despite social expectations and various posted and verbal warnings reminding users to refrain from allowing their smart phone to make noise at designated times and/or in predetermined areas, smart phones continue to make noise at innappropriate times and locations. The smart phone user may forget to manually set the smart phone to silent, or the user may ignore the warnings and reminders to prevent the smart phone from making noise.

SUMMARY

The foregoing paragraphs have been provided by way of general introduction, and are not intended to limit the scope of the appended claims. The described embodiments, together with further advantages, will be best understood by reference to the following detailed description taken in conjunction with the accompanying drawings.

A quiet zone detection system can include a quiet zone of a predetermined area in which smart mobile devices are automatically changed to a silent alert setting, if they are not already set to silent, when the smart mobile device enters the quiet zone. Additionally, when the smart mobile device is moved out of the quiet zone, an initial alert setting can be restored.

Further, a quiet zone can be created by implementing one or more quiet zone transceivers that can indicate that a predetermined area is designated as a quiet zone. As a smart mobile device is moved into quiet zone, thereby being within a predetermined range of the quiet zone transceiver, the smart mobile device can receive a signal that the smart mobile device has been moved into a quiet zone, and the signal can cause the smart mobile device to change the initial alert setting to silent if the initial alert setting is any alert setting other than silent.

A quiet zone can also be initiated by a smart mobile device in an area in which the smart mobile device may wish to not be disturbed. A smart mobile device in the area, or entering the area, can receive an alert from the initiator of the quiet zone alerting the other smart mobile devices in the quiet zone that a quiet zone has been implemented and request that each smart mobile device in the area agree to change the alert setting to silent.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
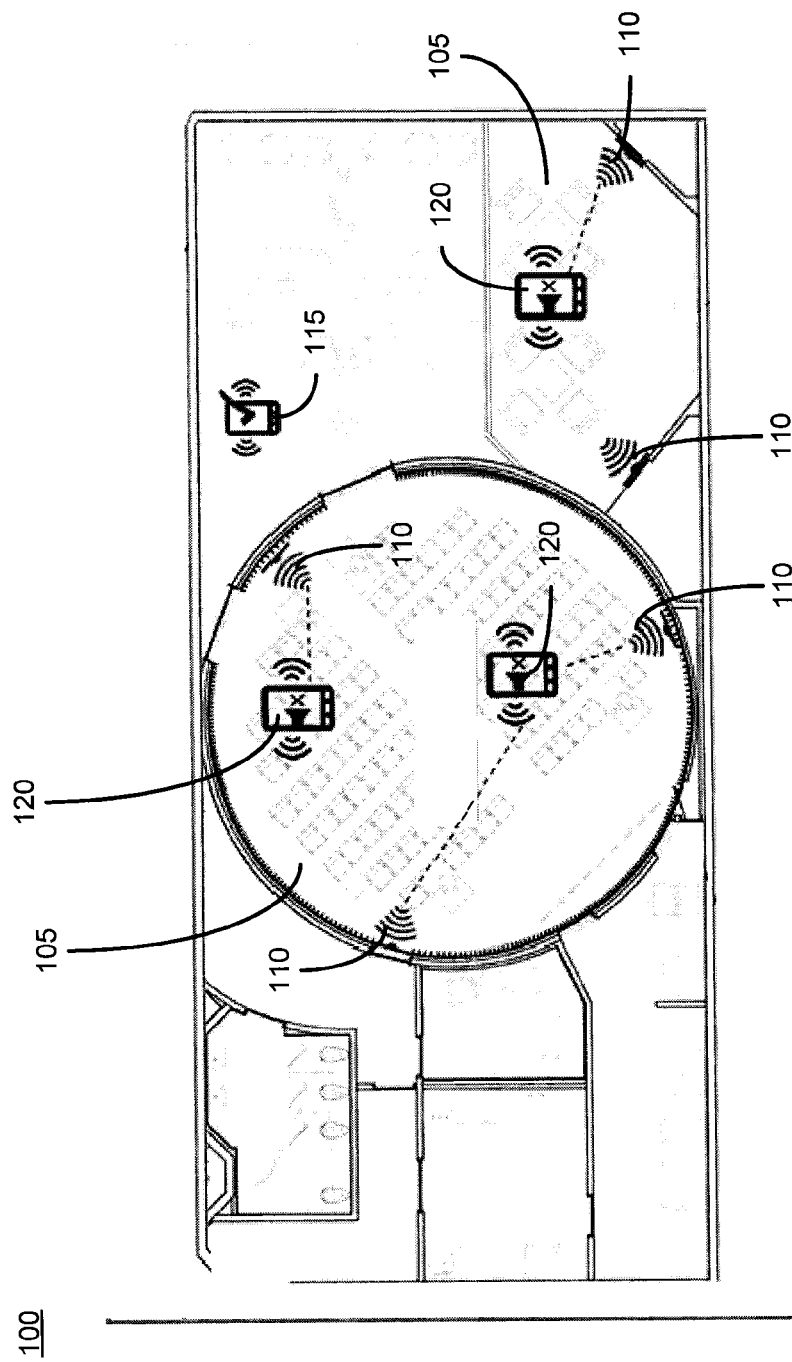
FIG. 1 depicts an exemplary overview of a quiet zone detection system.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views.

FIG. 1 depicts an exemplary overview of a quiet zone detection system 100 in which a quiet zone 105 includes one or more (typically three or more) quiet zone transceivers 110. The quiet zone transceivers 110 can define the area and perimeter of the quiet zone 105 via location services such as GPS, WiFi, and cellular networks as would be known to one of ordinary skill in the art. The quiet zone transceivers 110 can also communicate with a smart mobile device. Each smart mobile device can include software, such as a downloadable smart phone application or an embedded system configured to communicate with the quiet zone transceivers 110. The smart mobile device in the quiet zone 105, such as a silent device 120, can be automatically changed to a silent alert setting from any initial alert setting other than the silent alert setting when the smart mobile device enters the quiet zone 105. The smart mobile device can receive a signal from the quiet zone transceivers 110 when the smart mobile device moves into the quiet zone 105. The smart mobile device outside the quiet zone 105, such as loud device 115, can maintain the initial alert setting while outside the quiet zone 105 and/or restore the initial alert setting when moving out of the quiet zone 105 if the initial alert setting was changed to the silent alert setting when entering the quiet zone 105. It should be appreciated that the loud device 115 can become the silent device 120 when moving into the quiet zone 105. Additionally, if the initial alert setting of the smart mobile device is the silent alert setting, then the silent device 120 can be outside the quiet zone 105. It should also be appreciated that the quiet zone 105 can be a plurality of quiet zones 105, and each quiet zone 105 can be any predetermined area with any predetermined perimeter such that the one or more quiet zone transceivers 110 can provide suitable signal coverage throughout the quiet zone 105 as the quiet zone transceivers 110 are responsible for automatically changing the alert setting of the loud device 115 to the silent device 120 when the loud device 115 moves in the quiet zone 105.

Additionally, if a smart mobile device has the initial alert setting set to the silent alert setting when the smart mobile device enters a quiet zone 105, the quiet zone transceiver 110 can prevent the smart mobile device from activating any alert setting other than the silent alert setting, transmit a warning to the smart mobile device that the smart mobile device is in the quiet zone 105 and remind the smart mobile device not to activate any alert setting other than the silent alert setting, and the like. It should be appreciated that the loud device 115 and the silent device 120 can be the same smart mobile device such that the loud or silent designation corresponds to the current alert setting of the smart mobile device.

Figure 2:
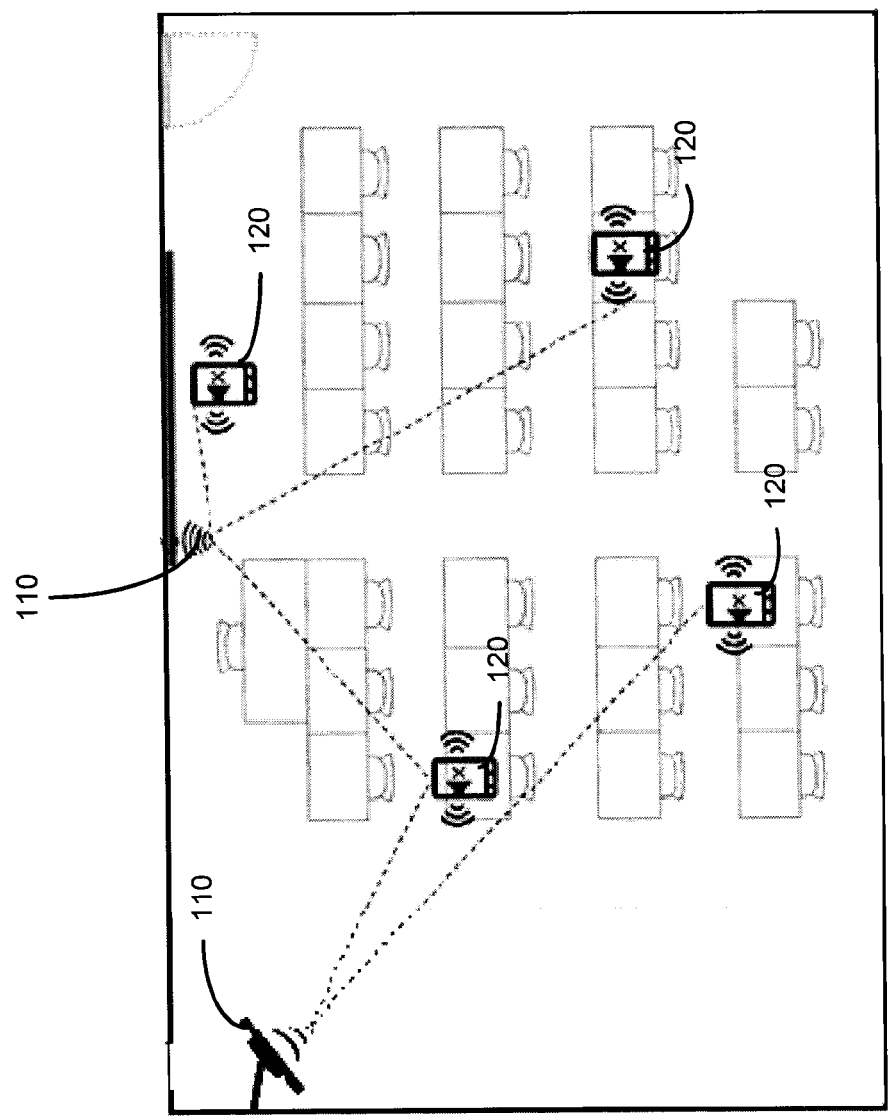
FIG. 2 depicts an exemplary overview of a quiet zone.

FIG. 2 depicts an exemplary overview of the quiet zone 105. The quiet zone 105 can include one or more quiet zone transceivers 110. The quiet zone transceivers 110 can define the predetermined perimeter of the quiet zone 105. The quiet zone transceivers 110 can also determine a location of the smart mobile device in the quiet zone 105 by monitoring signals emitted from the smart mobile device utilizing 2D direction of arrival, for example, as further described herein. The quiet zone transceiver 110 can be a standalone device such that the quiet zone transceiver 110 has independent circuitry configured to define the predetermined perimeter of the quiet zone 105 and communicate with the smart mobile devices moving into the quiet zone 105. Optionally, or additionally, the quiet zone transceiver 110 can be an embedded system in existing devices such as podiums, clocks, cameras, and the like. The one or more smart mobile devices in the quiet zone 105 can be automatically set to the silent alert setting, thereby being the silent device 120, when the smart mobile device is in the quiet zone 105. It should be appreciated that when the smart mobile device moves out of the quiet zone 105, the initial alert setting of the smart mobile device can be restored.

Figure 3:
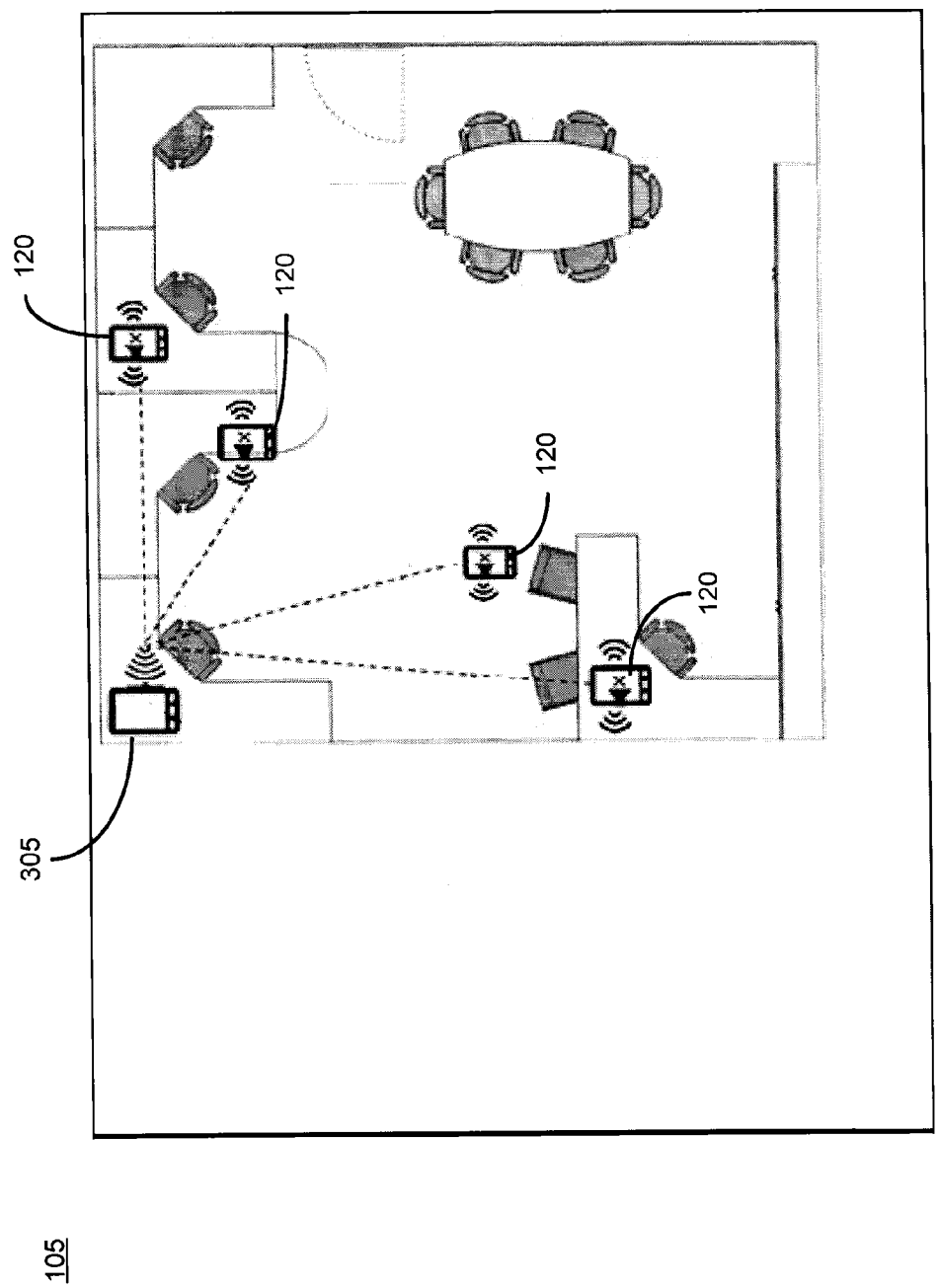
FIG. 3 depicts an exemplary overview of a quiet zone initiated by a remote device.

FIG. 3 depicts the quiet zone 105 in which the quiet zone 105 can be created by a remote device 305. The remote device 305 can be the smart mobile device containing a downloaded smart phone application and/or an embedded system such that the remote device 305 can act as the quiet zone transceiver 110. Therefore, the remote device 305 can include the same features as the independent quiet zone transceiver 110 as described herein. For example, the remote device 305 can designate a predetermined area in which the user of the remote device 305 may want to limit distractions, such as loud alerts, as the quiet zone 105. The smart mobile devices in the predetermined area when the quiet zone 105 is activated and/or the smart mobile devices entering the quiet zone 105 can receive an alert from the remote device 305 informing the smart mobile device that the smart mobile device has been moved into the quiet zone 105. The smart mobile device can automatically change the initial alert setting to the silent alert setting such that the smart mobile device is the silent device 120 in the quiet zone 105. Optionally, or additionally, the user of the smart mobile device can manually activate the silent alert setting when receiving the alert that the smart device has been moved into the quiet zone 105. Additionally, should the user of the smart mobile device attempt to override the silent alert setting and/or ignore the initial warning received from the remote device 305, the remote device 305 can receive user information including the name, phone number, MAC address, location, and the like of the smart mobile device so the device owner can be identified to a quiet zone coordinator and be notified on an electronic display, the coordinator's electronic device, etc., so corrective action might be taken. It should be appreciated that the remote device 305 can replace the independent quiet zone transceiver 110. Optionally, or additionally, the remote device 305 can be utilized in combination with the quiet zone transceiver 110 such that the remote device 305 can communicate with one or more smart mobile devices in the quiet zone 105 directly or via the quiet zone transceiver 110. Additionally, the remote device 305 can communicate with one or more quiet zone transceivers 110 to increase the predetermined perimeter of the quiet zone 105.

In an exemplary embodiment, the quiet zone 105 can be a classroom, for example. The quiet zone 105 can include one or more quiet zone transceivers 110. One of the smart mobile devices moved into the quiet zone 105 can be the remote device 305. The remote device 305 can belong to the teacher/professor of the classroom, for example. A requirement of the class can be to register the smart mobile device of each user, such that user information can be available to the remote device 305. As the smart mobile device of each user is moved into the quiet zone 105, the initial alert setting of each smart mobile device is changed to the silent alert setting, thereby setting each mobile device to be a silent device 120. However, should the user of the smart mobile device attempt to override the silent alert setting, the remote device 305 can receive a signal from the smart mobile device attempting to override the silent alert setting. The signal can be sent directly to the remote device 305 or via the quiet zone transceiver 110. The signal can contain user information including the name of the user of the smart mobile device, the MAC address of the smart mobile device, the current location of the smart mobile device, and the like. The signal can also contain a message explaining the reason for attempting to override the silent alert setting in the quiet zone 105. For example, the message could explain that the user of the smart mobile device is expecting an important call and needs to override the silent alert setting. The remote device 305 can automatically send a message when detecting an attempt to override the silent alert setting. The automatic message can include information reminding the user of the smart mobile device that the smart mobile device is in the quiet zone 105 and that the user agreed to automatically set the silent alert setting when the smart mobile device moves into the quiet zone 105. Additionally, the remote device 305 can view the message from the smart mobile device that includes the reason that the user of the smart mobile device is attempting to override the silent alert setting in the quiet zone 105. The user of the remote device 305 can compose a custom reply that can be transmitted to the user of the smart mobile device attempting to override the silent alert setting, such that the reply can be sent directly to the smart mobile device or via the quiet zone transceiver 110.

Figure 4:
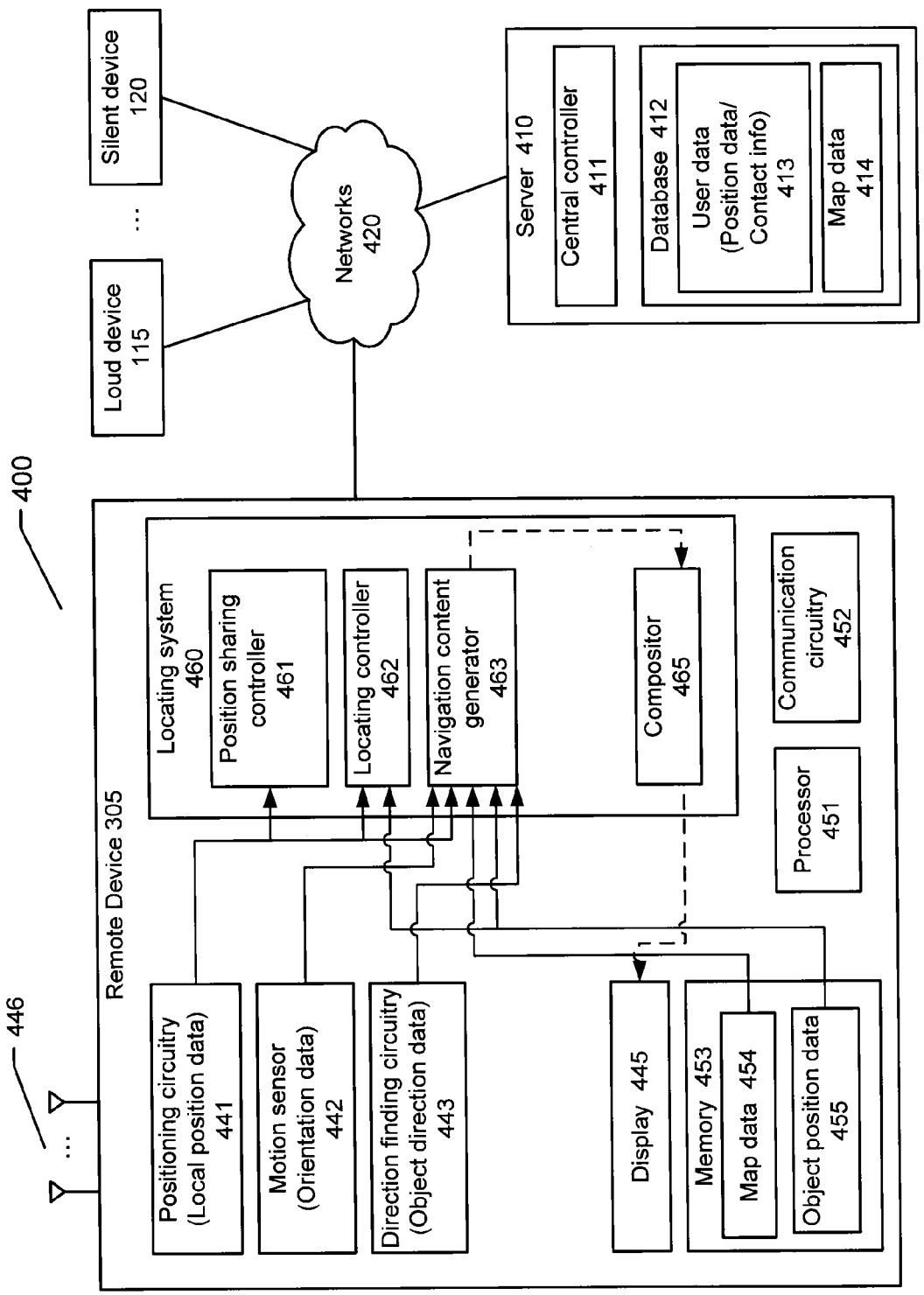
FIG. 4 depicts an exemplary overview of a system for locating a mobile device in a quiet zone.

FIG. 4 shows an exemplary system 400 for locating a silent device 120 or a loud device 115 with a remote device 305 according to an exemplary embodiment. The remote device 305 can be a smart mobile device of a user wishing to create a quiet zone with a predetermined perimeter, thereby acting as a quiet zone transceiver 110, as shown in FIG. 3. Additionally, the remote device 305 can be an independent quiet zone transceiver 110, as illustrated in FIG. 2. The system 400 includes a plurality of loud devices 115 and silent devices 120 that are connected to a server 410 through a network 420. It should be appreciated that each of the loud devices 115 and the silent devices 120 can operate as a remote device 305 should the user of the device initiate a quiet zone 105.

The server 410 can include a central controller 411 and a database 412 in various embodiments. The central controller 411 is configured to communicate with each of the remote device 305, the loud device 115, and the silent device 120 to receive user data 413 from each of the remote device 305, the loud device 115, and the silent device 120 and store the user data 413 into the database 412. The user data 413 can include position data indicating the location of each of the remote device 305, the loud device 115, and the silent device 120 and contact information such as phone number, user name, MAC address, and the like, that is maintained in each of the remote device 305, the loud device 115, and the silent device 120. A list of previously approved users of a remote device 305 can be granted permission to access the location and user information of a loud device 115 and/or a silent device 120. For example, it can be previously agreed upon by a teacher and students in a classroom setting that the teacher can have access to the location and user information of the device of each student in the class.

The database 412 stores map data 414 in addition to the user data 413. The map data 414 can include indoor or outdoor digital maps of certain areas where each of the remote device 305, the loud device 115, and the silent device 120 are located. The map data 414 can be used by each of the remote device 305, the loud device 115, and the silent device 120 for locating an object. Likewise, quiet zone transceivers 110 can determine the device (such as the loud device 115 and/or the silent device 120) location via triangulation or transmissions from the device, and comparing time of arrival differences at the respective quiet zone transceiver 110.

In addition, the central controller 411 is configured to transmit the user data 413 or the map data from the loud device 115 and the silent device 120 to the remote device 305 as a response to requests from the remote device 305. As described above, the central controller 411 can access the user data 413. Further, the central controller 411 is configured to forward messages between the remote device 305 and each of the loud device 115 and/or the silent device 120 thus facilitating communications between the remote device 305 and each of the loud device 115 and/or the silent device 120.

The central controller 411 and the database 412 can be implemented with software, hardware or combination thereof, and in one computer or as a distributed system. When implemented as a distributed system, components of the central controller 411 or the database 412 may be distributed on different computers. Each computer used for implementing the server 410 can include processors, memories, e.g., RAM, ROM, hard disk, and the like, communication circuitry for communicating with the network 420, and software, e.g., operating systems, database management systems, and the like, that can be executed in the processors such that the processors can perform the functions of central controller 411 and the database 412.

The networks 420 provide a communication channel between each of the remote device 305, the loud device 115, the silent device 120 and the server 410. The networks 420 can include a WLAN, a wired-LAN, a wireless cellular network, the Internet, a wide-area network, or a combination thereof.

The remote device 305, the loud device 115, and the silent device 120 can be configured to perform similar functions and can contain similar structures. The remote device 305, as described herein, can also be used as an example for describing the functions and structures of the loud device 115 and the silent device 120. The remote device 305 can be a mobile phone, a tablet computer, a laptop computer, a personal digital assistant (PDA), a wearable device such as a smart watch, a Google Glass, a quiet zone transceiver 110, and the like. As shown, the remote device 305 can include positioning circuitry 441, a motion sensor 442, direction finding (DF) circuitry 443, a camera 444, a display 445, an antenna array 446, a processor 451, communication circuitry 452, a memory 453, and a locating system 460.

The positioning circuitry 441 is configured to generate local position data indicating the current location of the remote device 305. The position data can be expressed as geographic coordinates such as latitude, longitude and elevation, or other suitable format in various examples. The positioning circuitry 441 can employ various technologies to fulfill its function in various embodiments. For example, the positioning circuitry 441 can include one or multiple positioning systems, such as a satellite-based positioning system, a radio-based positioning system, or other suitable positioning systems.

In an exemplary embodiment, the positioning circuitry 441 includes a satellite signal receiver configured to receive positioning signals from a satellite positioning system, such as the Global Positioning System (GPS), the GLObal NAvigation Satellite System (GLONASS), the Galileo navigation satellite system, the Beidou navigation satellite system, and the like. The receiver can calculate the distances between the satellites and silent device 120 based on the time difference between the transmitted and the received radio signals from the satellites, and subsequently determine the position of the remote device 305. In some examples, enhanced positioning systems, such as Differential Global Positioning System (DGPS), Wide Area Augmentation System (WAAS), and Real Time Kinematic (RTK) system, are used to improve accuracy of positioning data, allowing for, for example, accuracy within approximately 1-10 cm of actual position.

Optionally, or additionally, the positioning circuitry 441 can use a radio-based positioning system to determine a location of the remote device 305. The radio-based positioning system can receive signals, via the communication circuitry 452, from different base stations in a wireless network, such as a wireless local area network (WLAN) or a wireless cellular network. Based on the received signals, the radio-based positioning system can calculate distances from the user and the different base stations to obtain a user position.

The motion sensor 442 is configured to detect a moving state of the remote device 305 and accordingly generate orientation data indicating the current three-dimensional (3D) orientation of the remote device 305. In an example, the orientation data can be expressed with yaw, pitch and roll angles with respect to the geographic coordinate system used for expressing the positon data. In various embodiments, the motion sensor 442 can include a digital compass, or/and a gyroscope that can be made using micro-electromechanical systems (MEMS) technology, thus having a small size and a low cost. The digital compass, also referred to as a magnetometer, can be configured to detect orientation of the mobile device relative to the direction of earth magnetic field. The gyroscope can be configured to measure angular velocity of the remote device 305. Based on an initial orientation of the remote device 305 and the measured angular velocity, a current orientation of the remote device 305 at any time can be detected.

The direction finding (DF) circuitry 443 is configured to generate object direction data indicating a direction of an object device relative to the remote device 305 (the locator device). In an embodiment, when a radio signal transmitted from the object device is received at the antenna array 446, in order to determine the direction of the object device, the DF circuitry 443 can perform a two-dimensional (azimuth and elevation) direction of arrival (2D DOA) estimation based on the received radio signal using beamforming techniques. The antenna array 446 used for the 2D DOA estimation includes multiple element antennae, and can take various forms, such as uniform linear array, uniform rectangular array, uniform circular array, and the like. Radio signals received at different element antennae are processed using 2D DOA algorithms, such as 2D Multiple Signal Classification (MUSIC), Estimation of Signal Parameters via Rotational Invariance Techniques (ESPRIT), and the like, to determine a direction of arrival of the radio signal from the object device with respect to the antenna array 446. Accordingly, the direction of the object device relative to the mobile device 431 can be determined. It should be appreciated that the object device described herein can be one or more of the loud device 115 and the silent device 120, therefore allowing the remote device 305 to determine the direction of the loud device 115 and/or the silent device 120 should the remote device need to identify the location of one or more of the loud device 115 and/or the silent device 120.

The display 445 is configured to display user data 413, map data 414, information generated from the locating system 460, and the like. The display can take various forms in various embodiments, such as touch screens of a smart phone or tablet, projectors in smart eyeglasses, light emission devices (LEDs) in contact lens, head-mounted display (HMD), and the like.

The locating system 460 is configured to generate position information of an object device (referred to as object position data) received from the server 410 and object direction data of the object device received from the DF circuitry 443. As shown, the locating system can include a positioning sharing controller 461, a locating controller 462, a navigation content generator 463, and a compositor 465.

The position sharing controller (PSC) 461 is configured to transmit the local position data generated at the positioning circuitry 441 to the server 410. In various embodiments, the transmission of the local position data can be periodic during each of a predefined interval, or the transmission can be a response to a request received from the server generated from the remote device 305. In addition, the PSC 461 can be configured to maintain an approved list of devices agreeing to share predetermined information such as user data 412 and location. For example, a user of the remote device 305 can change the list, e.g., add or remove people, via a user interface, and accordingly, the PSC 461 changes the list and sends the updated list to the server. Further, the PSC 461 can be configured to trigger the communication circuitry 452 to transmit a signal for 2D DOA estimation. For example, the PSC 461 can receive a message from a locator device that tries to locate the loud device 115 requesting the loud device 115 to transmit a signal for 2D DOA estimation. As a response, the PSC 461 triggers the communication circuitry 452 to transmit such a signal.

The locating controller 462 is configured to receive map data of the vicinity of the remote device 305 from the server 410, for example, by transmitting a request message to the server 410. The map data can include a digital map of the vicinity of the remote device 305. For example, when a user of the remote device 305 is in a multi-storied building such as a shopping mall, a parking facility, and the like, an indoor 3D map of the multi-storied building can be received from the server 410. In alternative embodiments, the map data can be received through other methods, for example, using a flash disk that stores the map data or downloading from other computers in the Internet.

In addition, the locating controller 462 is configured to receive position data, referred to as object position data, of the object device, such as the loud device 115 and/or the silent device 120, from the server 410. In an example, when the object device, which the remote device 305 (the locator device) tries to locate, is powered off and no update position data is stored on the server 410, the position data last received at the server 410 is used as the object positon data, and the time of receiving this object position data is also received at the locating controller and eventually displayed to the user of the remote device 305. In another example, the locating controller 462 is configured to send a message via the server 410 to the object device to request for the latest position data of the object device instead of using the object position data stored in the server 410. The locating controller 462 stores the received map data and object position data into the memory 453 shown as map data 454 and object position data 455, respectively, in FIG. 4.

The locating controller 462 is further configured to request a transmission of signal for 2D DOA estimation from the object device. In an embodiment, the locating controller 462 can first determine whether the object device is within a predefined radius, e.g. 50 meters, from the remote device based on the object position data 454 stored in the memory 453 and the local position data generated at the position circuitry 441. Next, when the object device is within the predefined radius, the locating controller 462 can send a message to the object device requesting the object device to transmit a signal for 2D DOA estimation. Then, the DF circuitry 443 can generate the object direction data indicating the direction of the object device relative to the remote device 305 upon receiving the signal.

The navigation content generator 463 is configured to generate navigation information based on the map data 454, the object position data 455, and the local position data generated at the positioning circuitry 441. In various embodiments, the navigation information can include location or address of the object device, distance between the object device and the remote device 305, directions describing how to reach the object device, and the like. The navigation information can take forms of contextual format or graphical format, e.g., text, marks or arrows of circles, etc.

The navigation content generator 463 is configured to generate location information based on the object position data 455, map data 454, the local position data generated at the positioning circuitry 441, the orientation data generated at the motion sensor 442, and direction finding circuitry 443.

The compositor 465 is configured to generate the navigational view corresponding to location of the object device and provide the view to the display 445. In an example, the compositor 465 receives the location information generated at the navigation content generator 463 which can be transmitted to the display 445. The location information and any prompt information (textual information) can be arranged at predefined location on the display 445. As the result, a location of the object device can be presented in the display 445.

As shown in FIG. 4, arrows with solid line connecting the components 441, 442, 443, 445, 454, and 455 with the components 461, 462, 463, and 465 in the remote device 305 illustrate what data is provided from the components 441, 442, 443, 445, 454, and 455 to the components 461, 462, 463, and 465. In addition, arrows with dash line connecting the navigation content generator 463 to the compositor 465 and the display 445 illustrate routes of transmission of navigational content between the components 463, 465, and 445.

The locating system 460 can be implemented using any suitable software, hardware, or combination of software and hardware in various embodiments. The software can include computer-executable instructions that are stored in the memory 453 and, when executed by the processor 451, perform the functions of the locating system 460 described above. The hardware can be one or multiple discrete circuits or integrated circuits (ICs). The IC can be an application-specific integrated circuit (ASIC), Field-programmable gate arrays (FPGAs), and the like.

The memory 453 is configured to store computer-readable instructions or program modules of various software, such as software for implementing, with or without other hardware, the elements 441, 442, 443, 445, the locating system 460, and the communication circuitry 452. In addition, the memory 453 is configured to store the map data 454, the objection data 455, and the like, as described above. The memory 453 uses a variety of computer storage media in various embodiments, such as random access memory (RAM), read-only memory (ROM), electrically erasable programmable read-only memory (EEPROM), flash memory, compact disc read-only memory (CD-ROM), digital versatile disk (DVD) or other optical disk storage, magnetic cassettes, magnetic tape, magnetic disk storage, and the like.

The processor 451 is configured to execute the computer-readable instructions or program modules stored in the memory 453 to perform various functions of the components of the mobile device 431 as described above. In various embodiments, the mobile device 431 may include multiple varied processors to perform the functions performed by the processor 451.

The communication circuitry 452 is configured to provide communication channels for the components, such as the positioning sharing controller 461, in the remote device 305 to communicate with other computers or devices via various communication networks, such as the networks 420. The various communication networks can include WLANs, wired-LANs, wireless cellular networks, Internet, wide-area networks, and the like, and accordingly, the communication circuitry 443 can operate with various communication protocols, such as WiFi, Bluetooth, Internet protocols, wireless cellular network protocols (e.g. general packet radio service (GPRS), wideband code division multiple access (WCDMA), Long-Term Evolution (LTE)), any other communication protocols, or any combination thereof.

In addition, the communication circuitry 452 can be configured to receive wireless signals from different base stations in a wireless network, such as a wireless local area network (WLAN) or a wireless cellular network, and provide information needed by a radio-based positioning system to the positioning circuitry 441.

Further, the communication circuitry 452 can be configured to transmit a signal for 2D DOA estimation when triggered by the locating controller 462.

When performing the above functions, the communication circuitry 452 operates with an antenna. The antenna is configured to receive or transmit wireless signals to support the wireless communications performed by the communication circuitry 452. The antenna can be the antenna array 446 or other separate antenna or antennae in various embodiments.

It is to be understood that in various embodiments the components included in the remote device 305 can be integrated into one device, such as a mobile phone, or they can be separate components connected wirelessly or with cables. For example, the positioning circuitry 441 can include a satellite signal receiver that is implemented as periphery equipment or the display 445 can be a head-mounted display.

It should be appreciated that when the remote device 305 is the quiet zone transceiver 110, the quiet zone transceiver 110 can perform the functions as the remote device 305 as described herein. However, additionally, the quiet zone indicator 100 can transmit location and user data 413 to a designated smart mobile device. For example, the teacher of a classroom can designate that the classroom is a quiet zone 105 by using one or more quiet zone indicators 110. The teacher can have a mobile device which can be designated to receive location information and user data transmitted from the quiet zone transceiver 110 when attempting to locate one or more of the loud device 115 and/or the silent device 120 for various reasons, as further described herein.

Figure 5:
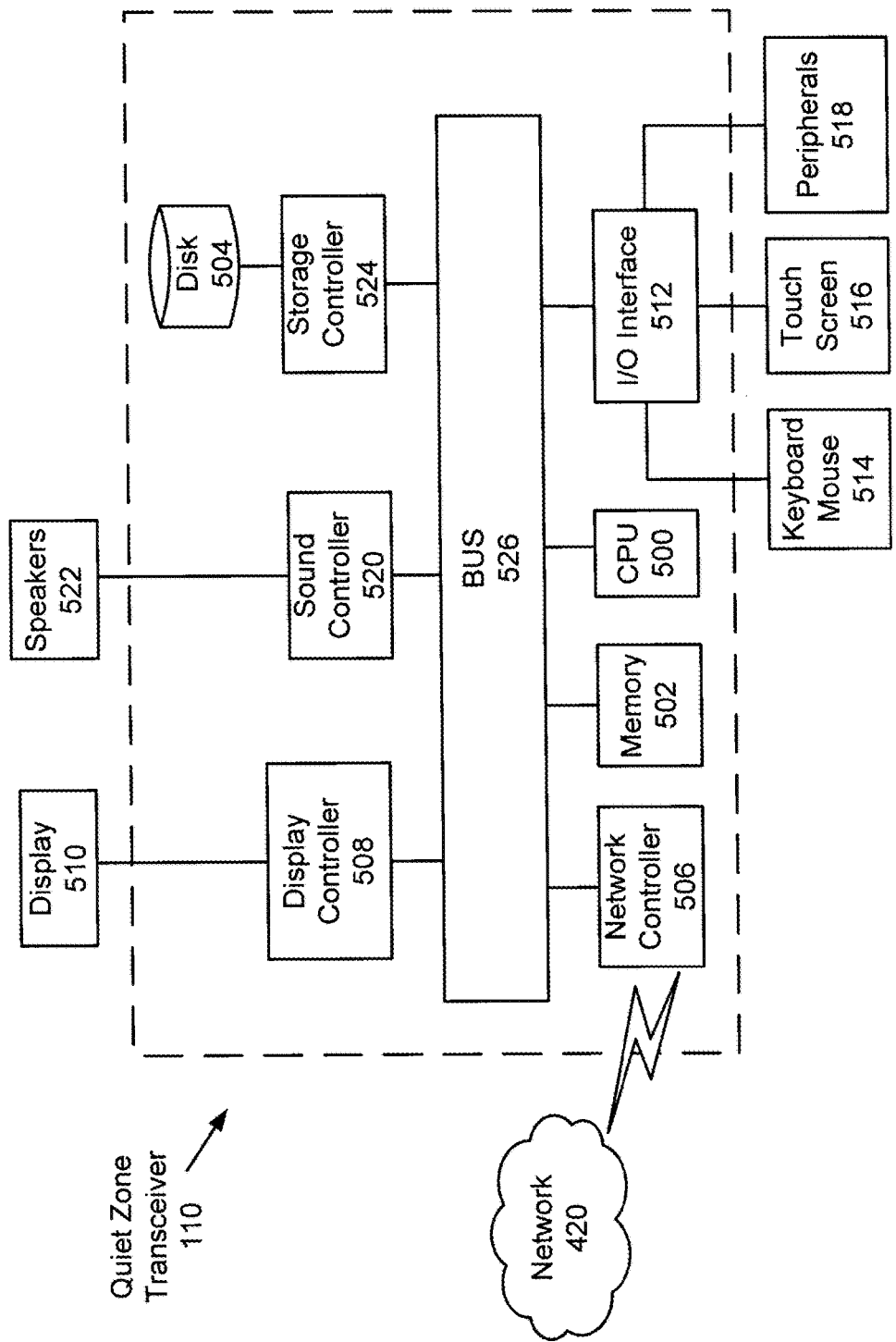
FIG. 5 depicts an exemplary hardware description for a quiet zone transceiver.

Next, a hardware description of the quiet zone transceiver 110 according to exemplary embodiments is described with reference to FIG. 5. In FIG. 5, the quiet zone transceiver 110 includes a CPU 500 which performs the processes described herein. The process data and instructions may be stored in a memory 502. These process and instructions may also be stored on a storage medium disk 504 such as a hard drive (HDD) or portable storage medium or may be stored remotely. Further, the aspects of the disclosure are not limited by the form of the computer-readable media on which the instructions of the inventive method are stored. For example, the instructions may be stored on CDs, DVDs, in FLASH memory, RAM, ROM, PROM, EPROM, EEPROM, hard disk or any other information processing device with which the quiet zone transceiver 110 communicates, such as a server or computer.

Further, the aspects of the disclosure may be provided as a utility application, background daemon, or component of an operating system, or combination thereof, executing in conjunction with CPU 500 and an operating system such as Microsoft Windows 7, UNIX, Solaris, LINUX, Apple MAC-OS and other systems known to those skilled in the art.

The hardware elements of the quiet zone transceiver 110 may be realized by various circuitry elements, known to those skilled in the art. For example, CPU 500 may be a Xenon or Core processor from Intel of America or an Opteron processor from AMD of America, or may be other processor types that would be recognized by one of ordinary skill in the art. Alternatively, the CPU 500 may be implemented on an FPGA, ASIC, PLD or using discrete logic circuits, as one of ordinary skill in the art would recognize. Further, CPU 500 may be implemented as multiple processors cooperatively working in parallel to perform the instructions of the inventive processes described above.

The quiet zone transceiver 110 in FIG. 5 also includes a network controller 506, such as an Intel Ethernet PRO network interface card from Intel Corporation of America, for interfacing with network 420. As can be appreciated, the network 420 can be a public network, such as the Internet, or a private network such as an LAN or WAN network, or any combination thereof and can also include PSTN or ISDN sub-networks. The network 420 can also be wired, such as an Ethernet network, or can be wireless such as a cellular network including EDGE, 3G and 4G wireless cellular systems. The wireless network can also be WiFi, Bluetooth, or any other wireless form of communication that is known. The quiet zone transceiver 110 can communicate to one or more remote computers, such as a server computer, a router, a personal computer, portable computer, microprocessor-based entertainment appliance, a peer device or other common network node.

The quiet zone transceiver 110 further includes a display controller 508, such as a NVIDIA GeForce GTX or Quadro graphics adaptor from NVIDIA Corporation of America for interfacing with display 510, such as a Hewlett Packard HPL2445w LCD monitor. A general purpose I/O interface 512 interfaces with a keyboard and/or mouse 514 as well as a touch screen panel 516 on or separate from display 510. General purpose I/O interface also connects to a variety of peripherals 518 including printers and scanners, such as an OfficeJet or DeskJet from Hewlett Packard.

A sound controller 520 is also provided in the quiet zone transceiver 110, such as Sound Blaster X-Fi Titanium from Creative, to interface with speakers/microphone 522 thereby providing sounds and/or music.

The general purpose storage controller 524 connects the storage medium disk 504 with communication bus 526, which may be an ISA, EISA, VESA, PCI, or similar, for interconnecting all of the components of the computer 411. A description of the general features and functionality of the display 510, keyboard and/or mouse 514, as well as the display controller 508, storage controller 524, network controller 506, sound controller 520, and general purpose I/O interface 512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chip.

Figure 6:
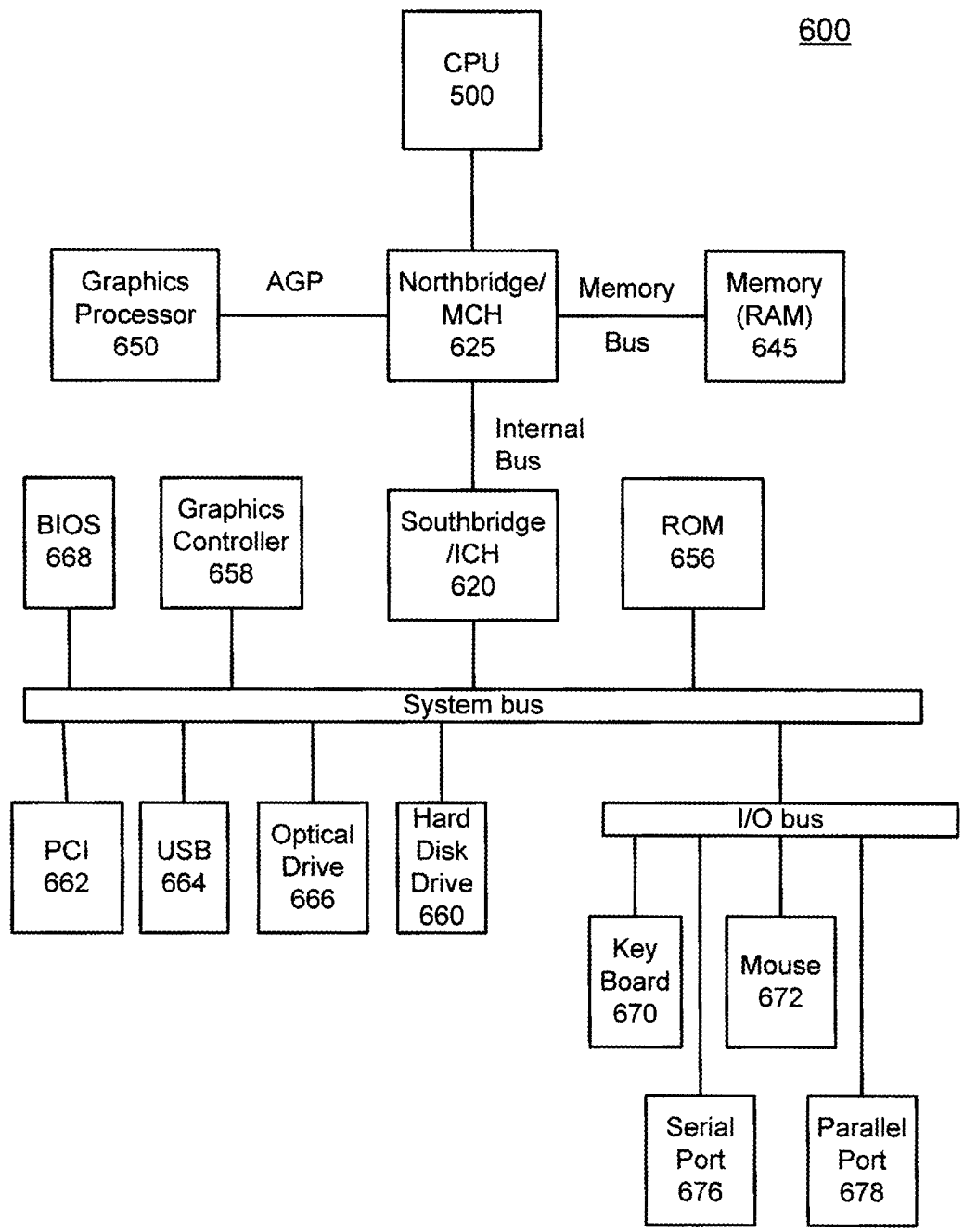
FIG. 6 depicts an exemplary data processing system for implementing the quiet zone transceiver.

FIG. 6 shows an exemplary data processing system 600, according to according to certain embodiments, for implementing the quiet zone transceiver 110. The data processing system 600 is an example of a computer in which specific code or instructions implementing the processes or methods of the illustrative embodiments may be located to create a particular machine for implementing the above-noted method.

In FIG. 6, data processing system 600 employs a hub architecture including a north bridge and memory controller hub (NB/MCH) 625 and a south bridge and input/output (I/O) controller hub (SB/ICH) 620. The data processing system 600 includes a central processing unit (CPU) 500 that is connected to NB/MCH 625. The CPU 500 is circuitry for implementing the quiet zone transceiver 110 and performs the functions and processes described above. The NB/MCH 625 also connects to the memory 645 via a memory bus, and connects to the graphics processor 650 via an accelerated graphics port (AGP). The NB/MCH 625 also connects to the SB/ICH 620 via an internal bus (e.g., a unified media interface or a direct media interface). The CPU 500 may contain one or more processors and even may be implemented using one or more heterogeneous processor systems.

Figure 7:
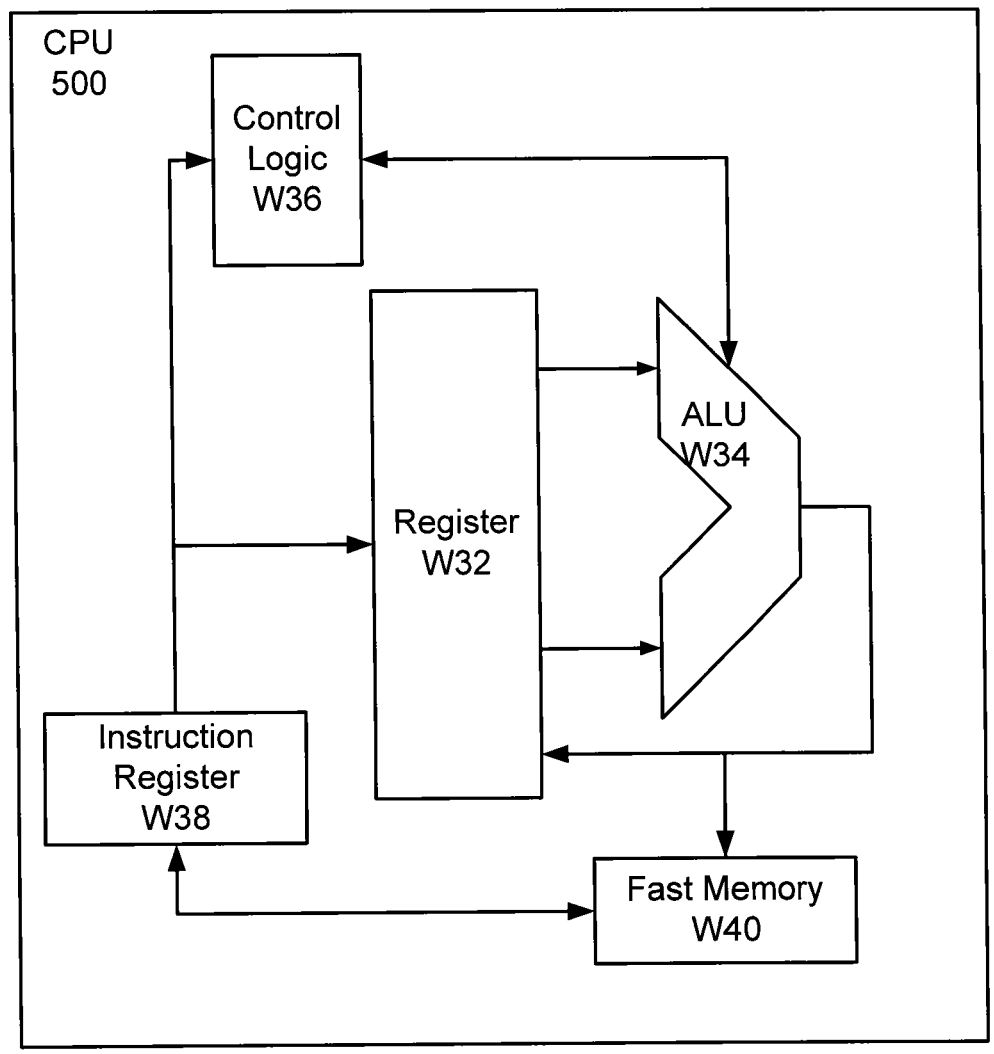
FIG. 7 depicts an exemplary implementation of a CPU.

For example, FIG. 7 shows an exemplary implementation of CPU 500 according to an embodiment of the disclosure. In one implementation, the instruction register 738 retrieves instructions from the fast memory 740. At least part of these instructions are fetched from the instruction register 738 by the control logic 736 and interpreted according to the instruction set architecture of the CPU 500. Part of the instructions can also be directed to the register 732. In one implementation, the instructions are decoded according to a hardwired method, and in another implementation, the instructions are decoded according a microprogram that translates instructions into sets of CPU configuration signals that are applied sequentially over multiple clock pulses. After fetching and decoding the instructions, the instructions are executed using the arithmetic logic unit (ALU) 734 that loads values from the register 732 and performs logical and mathematical operations on the loaded values according to the instructions. The results from these operations can be feedback into the register and/or stored in the fast memory 740. According to certain implementations, the instruction set architecture of the CPU 500 can use a reduced instruction set architecture, a complex instruction set architecture, a vector processor architecture, a very large instruction word architecture. Furthermore, the CPU 500 can be based on the Von Neuman model or the Harvard model. The CPU 500 can be a digital signal processor, an FPGA, an ASIC, a PLA, a PLD, or a CPLD. Further, the CPU 500 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 6, the data processing system 600 can include that the SB/ICH 620 is coupled through a system bus to an I/O Bus, a read only memory (ROM) 656, universal serial bus (USB) port 664, a flash binary input/output system (BIOS) 668, and a graphics controller 658. PCI/PCIe devices can also be coupled to SB/ICH 620 through a PCI bus 662.

The PCI devices may include, for example, Ethernet adapters, add-in cards, and PC cards for notebook computers. The Hard disk drive 660 and CD-ROM 666 can use, for example, an integrated drive electronics (IDE) or serial advanced technology attachment (SATA) interface. In one implementation, the I/O bus can include a super I/O (SIO) device.

Further, the hard disk drive (HDD) 660 and optical drive 666 can also be coupled to the SB/ICH 620 through a system bus. In one implementation, a keyboard 670, a mouse 672, a parallel port 678, and a serial port 676 can be connected to the system bust through the I/O bus. Other peripherals and devices that can be connected to the SB/ICH 620 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Figure 8:
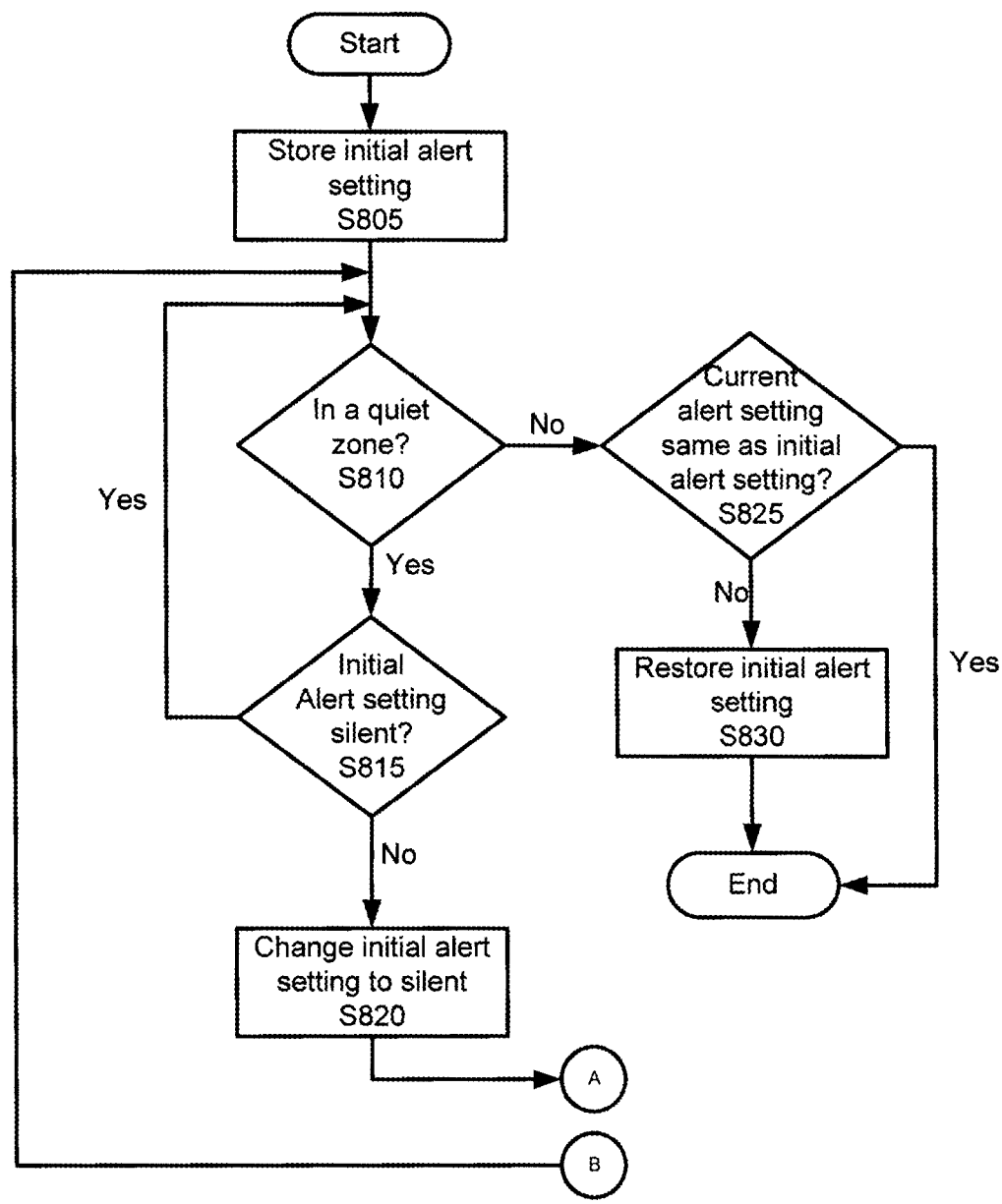
FIG. 8 is a flowchart depicting an exemplary method of implementing the quiet zone.
Figure 9:
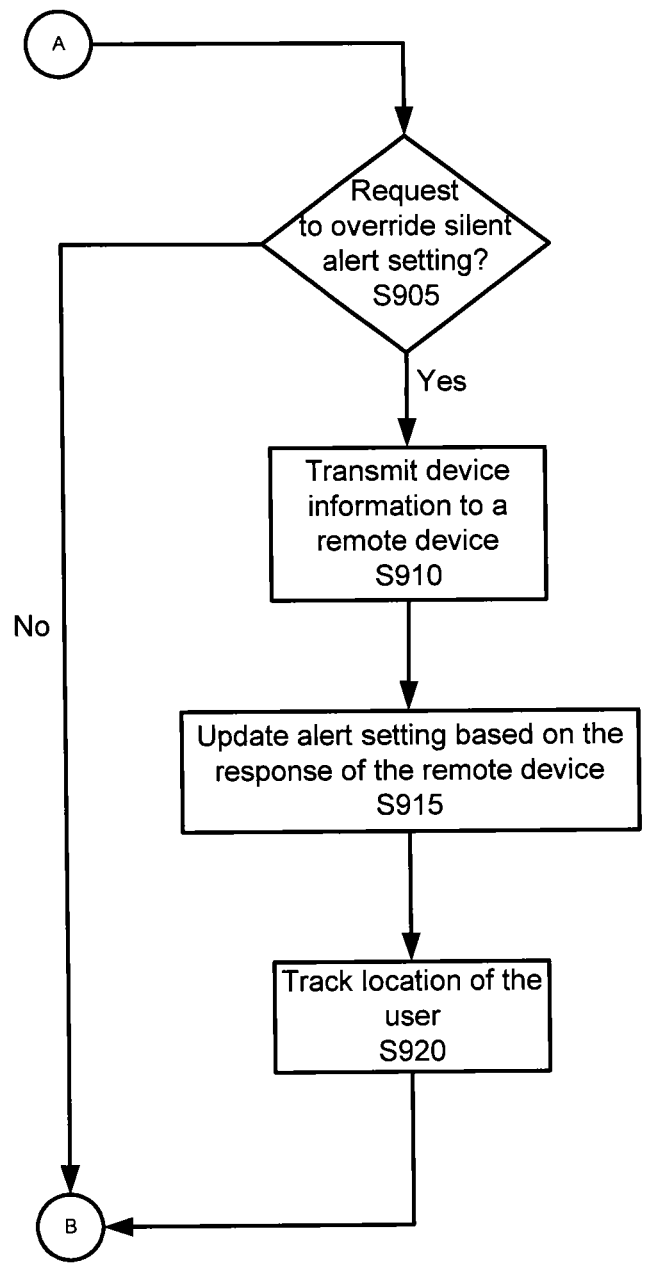
FIG. 9 is a flowchart depicting an exemplary method of requesting to override the silent alert setting in the quiet zone.

Next, FIG. 8 illustrates an exemplary algorithmic flowchart for changing a loud alert setting to a silent alert setting on a smart mobile device when the smart mobile device is moved into a quiet zone according to one aspect of the present disclosure. The hardware description above, exemplified by any of the structure examples shown in FIG. 5 or FIG. 6 constitutes or includes specialized corresponding structure that is programmed or configured to perform the algorithm shown in FIG. 8. For example, the algorithm shown in FIG. 8 may be completely performed by the circuitry included in the single device shown in FIG. 5 or the chipset as shown in FIG. 7.

In S805, the initial alert setting can be stored in memory 453 and/or in memory 502.

In S810, it can be determined whether the smart mobile device has been moved into the quiet zone 105. The quiet zone transceivers 110 can receive a signal from the smart mobile device indicating an initial alert setting of the smart mobile device. The smart mobile device can receive a signal from the quiet zone transceiver 110 indicating that the smart mobile device has moved into the quiet zone 105. The smart mobile device can change the initial alert setting of the smart mobile device to the silent alert setting when the smart mobile device determines the smart mobile device has moved into the quiet zone 105. If it is determined that the smart mobile device has not been moved into the quiet zone 105, then it can be determined in S825 if the current alert setting of the mobile device is the same as the initial alert setting.

If, in S825, it is determined that the current alert setting is the same as the initial alert setting stored in S805, the process can end. However, if the current alert setting is determined to be different than the initial alert setting stored in S805, then the initial alert setting can be restored in S830.

In S830, the current alert setting can be changed to restore the initial alert setting stored in S805. For example, if the initial alert setting stored in S805 is the loud alert setting, the current alert setting of the smart mobile device may be silent if the smart mobile device was moved into the quiet zone 105. Therefore, when the smart mobile device is moved out of the quiet zone 105, the current alert setting is the silent alert setting, and the silent alert setting can be changed to the initial alert setting stored in S805 (the loud alert setting) when the smart mobile device is moved out of the quiet zone 105.

However, in S810, if it is determined that the smart mobile device has been moved into the quiet zone 105, it can then be determined in S815 if the initial alert setting is the silent alert setting.

In S815, it can be determined if the initial alert setting is the silent alert setting by determining if the initial alert setting stored in S805 is the silent alert setting. If the initial alert setting is the silent alert setting then the process can return to S810 to continuously determine if the smart mobile device is in the quiet zone 105.

However, in S815, if the initial alert setting is not the silent alert setting, then the initial alert setting can be changed to the silent alert setting in S820.

In S820, the initial alert setting can be changed to the silent alert setting when the initial alert setting is not the silent alert setting. For example, if the initial alert setting of the smart mobile device is the loud alert setting (corresponding to the loud device 115), the loud alert setting can be changed to the silent alert setting (corresponding to the silent device 120) when the smart mobile device is moved into the quiet zone 105.

Next, in S905, it can be determined if the remote device 305 receives a request to override the silent alert setting. If there is not a request to override the silent alert setting, then the process can return to S810 to continuously determine if the smart mobile device is in the quiet zone 105.

However, in S905, if there is a request to override the silent alert setting then the smart mobile device can transmit information to the remote device 305 in S910.

In S910, the smart mobile device can transmit information to the remote device 305. The information can include user data 412 such as the name, phone number, MAC address, location, and the like associated with the smart mobile device attempting to override the silent alert setting. For example, the smart mobile device can attempt to override the silent alert setting if the user of the smart mobile device is expecting an important/emergency communication. The reason for the attempt to override the silent alert setting can be communicated to the remote device 305 when the attempt to override the silent alert setting is initiated. Additionally, the smart mobile device can receive an initial automated response from the remote device 305 reminding the user of the smart mobile device that the smart mobile device is in the quiet zone 105.

In S915, the current alert setting can be updated based on the response of the remote device 305. For example, the current alert setting can be updated to the initial alert setting stored in S805 if the remote device 305 agrees that the smart mobile device can override the silent alert setting.

In S920, the location of the user of the smart mobile device requesting to override the silent alert setting in the quiet zone 105 can be tracked via 2D direction of arrival, for example. The location of the user may need to be tracked if the user of the smart mobile device disregards the instructions from the remote device 305, does not share the user data 412 with the remote device 305, continues to attempt to override the silent alert setting without permission from the remote device 305, and the like. For example, in a classroom, the teacher may create the quiet zone 105 using the remote device 305. In the event that the smart mobile device associated with a student in the quiet zone 105 attempts to override the silent alert setting without permission, the location of the smart mobile device may need to be tracked to issue a verbal warning, punishment, confirm which student is attempting to override the silent alert setting, and the like. Once the location of the smart mobile device can be tracked in S920, the process can return to S810 to continuously determine if the smart mobile device is in the quiet zone 105.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

What is claimed is:

1. A device comprising:
   circuitry configured to
      determine if the device is moved into a quiet zone, the quiet zone having a predetermined perimeter defined by a plurality of transceivers, each transceiver being in a predetermined location,
      determine if an initial alert setting of the device is a silent alert setting when the device was determined to have been moved into the quiet zone,
      receive a signal from a remote device that triggers a change to the initial alert setting of the device when the initial alert setting is not the silent alert setting,
      determine if a request is received from the device to override the silent alert setting on the device, and when the request is received, transmit device information from the device to the remote device when the device overrides the silent alert setting, wherein the remote device tracks a location of the device based on the device information, wherein the remote device includes
         positioning circuitry configured to generate local position data of the remote device;
         a motion sensor configured to detect a moving state of the remote device, and in response to detecting the moving state of the remote device, generate orientation data indicating a current three-dimensional orientation of the remote device;
         direction finding circuitry configured to generate direction data of the device indicating a direction of the device based on two-dimensional direction of arrival estimation based on radio signals received from the device, wherein the two-dimensions of the direction of arrival estimation include azimuth and elevation;
         locating circuitry configured to
            receive map data of an area in which the remote device is positioned,
            receive the device information, wherein the device information includes device position data,
            determine if the device is within a predetermined radius relative to the remote device based on the device position data, and
            when the device is within the predetermined radius, request the device to transmit a signal for the two-dimensional direction of arrival estimation; and
         a navigation content generator configured to determine a location of the device based on the device position data, the map data, the local position data generated at the positioning circuitry, and the orientation data generated at the motion sensor, and the direction data generated at the direction finding circuitry,
      receive a response signal from the remote device in response to transmitting the device information to the remote device and set the alert setting to correspond with setting information in the response signal, and
      restore the alert setting to the initial alert setting when the device is moved out of the quiet zone.

2. The device of claim 1, wherein the remote device is a quiet zone transceiver.

3. The device of claim 1, wherein the remote device is a smart mobile device.

4. The device of claim 1, wherein the circuitry is configured to receive an alert from the remote device in response to the device being moved into the quiet zone.

5. The device of claim 1, wherein the device information includes the name, phone number, MAC address, and location associated with the device.

6. The device of claim 1, wherein the device is configured to receive an automated reply from the remote device in response to a request from the device to override the silent alert setting.

7. The device of claim 1, wherein the device is configured to prohibit an override of the silent alert setting until the response signal from the remote device is received.

8. A method of implementing a quiet zone comprising:
   determining, via processing circuitry, if the device is moved into a quiet zone, the quiet zone having a predetermined perimeter defined by a plurality of transceivers, each transceiver being in a predetermined location;

determining, via the processing circuitry, if an initial alert setting of the device is a silent alert setting when the device was determined to have been moved into the quiet zone;

receiving a signal from a remote device that triggers a change to the initial alert setting of the device when the initial alert setting is not the silent alert setting;

determining, via the processing circuitry, if a request is received from the device to override the silent alert setting on the device, and when the request is received, transmit device information from the device to the remote device when the device overrides the silent alert setting, wherein the remote device tracks a location of the device based on the device information, wherein tracking the location of the device includes generating, via positioning circuitry, local position data of the remote device;

detecting, via a motion sensor, a moving state of the remote device, and in response to detecting the moving state of the remote device, generating orientation data indicating a current three-dimensional orientation of the remote device;

generating, via direction finding circuitry, direction data of the device indicating a direction of the device based on two-dimensional direction of arrival estimation based on radio signals received from the device, wherein the two-dimensions of the direction of arrival estimation include azimuth and elevation;

receiving, via locating circuitry, map data of an area in which the remote device is positioned;

receiving, via the locating circuitry, the device information, wherein the device information includes device position data;

determining, via the locating circuitry, if the device is within a predetermined radius relative to the remote device based on the device position data, and when the device is within the predetermined radius, requesting, via the locating circuitry, the device to transmit a signal for the two-dimensional direction of arrival estimation; and determining, via a navigation content generator, a location of the device based on the device position data, the map data, the local position data generated at the positioning circuitry, and the orientation data generated at the motion sensor, and the direction data generated at the direction finding circuitry;

receiving a response signal from the remote device in response to transmitting the device information to the remote device and set the alert setting to correspond with setting information in the response signal; and restoring the alert setting to the initial alert setting when the device is moved out of the quiet zone.

9. The method of claim 8, wherein the remote device is a quiet zone transceiver.

10. The method of claim 8, wherein the remote device is a smart mobile device.

11. The method of claim 8, wherein the circuitry is configured to receive an alert from the remote device in response to the device being moved into the quiet zone.

12. The method of claim 8, wherein the device information includes the name, phone number, MAC address, and location associated with the device.

13. The method of claim 8, wherein the device is configured to receive an automated reply from the remote device in response to a request from the device to override the silent alert setting.

14. The method of claim 8, wherein the device is configured to prohibit an override of the silent alert setting until the response signal from the remote device is received.

15. A remote device comprising:
circuitry configured to
determine if a device is moved into a quiet zone, the quiet zone having a predetermined perimeter defined by a plurality of transceivers, each transceiver being in a predetermined location, determine if an initial alert setting of the device is a silent alert setting when the device was determined to have been moved into the quiet zone, transmit a signal from the remote device that triggers a change to the initial alert setting of the device when the initial alert setting is not the silent alert setting, determine if the device attempts to override the silent alert setting on the device, and receive device information from the device when the device overrides the silent alert setting, in response to the device attempting to override the silent alert setting on the device, track the location of the device, wherein tracking the location of the device includes positioning circuitry configured to generate local position data of the remote device;

a motion sensor configured to detect a moving state of the remote device, and in response to detecting the moving state of the remote device, generate orientation data indicating a current three-dimensional orientation of the remote device;

direction finding circuitry configured to generate direction data of the device indicating a direction of the device based on two-dimensional direction of arrival estimation based on radio signals received from the device, wherein the two-dimensions of the direction of arrival estimation include azimuth and elevation;

locating circuitry configured to
receive map data of an area in which the remote device is positioned,
receive the device information, wherein the device information includes device position data,
determine if the device is within a predetermined radius relative to the remote device based on the device position data, and
when the device is within the predetermined radius, request the device to transmit a signal for the two-dimensional direction of arrival estimation; and a navigation content generator configured to determine a location of the device based on the device position data, the map data, the local position data generated at the positioning circuitry, and the orientation data generated at the motion sensor, and the direction data generated at the direction finding circuitry, in response to receiving the device information, transmit a response signal to the device causing the device to set the alert setting to correspond with setting information in the response signal, and determine when the device is moved out of the quiet zone.

16. The remote device of claim 15, wherein the remote device is a quiet zone transceiver.

17. The device of claim 15, wherein the remote device is a smart mobile device and the quiet zone transceiver.

18. The device of claim 15, wherein the circuitry is configured to transmit an alert to the device in response to the device being moved into the quiet zone.

19. The device of claim 15, wherein the circuitry is configured to create the quiet zone with a predetermined perimeter when the remote device is the quiet zone transceiver.

20. The device of claim 15, wherein the remote device transmits an automated reply to the device in response to a request from the device to override the silent alert setting.

* * * * *